United States Patent
Cardillo et al.

(10) Patent No.: US 12,236,226 B2
(45) Date of Patent: Feb. 25, 2025

(54) SECURE UPDATE AND AUDIT OF ELECTRONIC CONTROL UNITS

(71) Applicant: FORD GLOBAL TECHNOLOGIES, LLC, Dearborn, MI (US)

(72) Inventors: John Cardillo, Windsor (CA); Satya Meenakshi Raparthi, Farmington Hills, MI (US); Vijayababu Jayaraman, Novi, MI (US); Jason Michael Miller, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 17/886,127

(22) Filed: Aug. 11, 2022

(65) Prior Publication Data

US 2024/0053974 A1   Feb. 15, 2024

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 6/65; G06F 8/71
USPC .................................................. 717/168–174
See application file for complete search history.

(56) References Cited

U.S. PATENT DOCUMENTS

| | | | | |
|---|---|---|---|---|
| 6,260,157 B1 * | 7/2001 | Schurecht | ............... | G06F 9/328 |
| | | | | 711/202 |
| 9,205,809 B2 * | 12/2015 | Becker | .................... | G06F 12/00 |
| 9,400,644 B2 * | 7/2016 | Mahajan | ................ | G06F 16/951 |
| 9,678,867 B2 * | 6/2017 | Dressler | .................... | G06F 8/65 |
| 9,720,680 B2 * | 8/2017 | Diedrich | .............. | H04B 1/3822 |
| 9,904,531 B2 * | 2/2018 | Suzuki | ....................... | G06F 8/65 |
| 10,057,243 B1 * | 8/2018 | Kumar | ................ | H04L 63/0823 |
| 10,394,548 B2 * | 8/2019 | Fox | ........................ | G06F 21/577 |
| 10,447,483 B1 * | 10/2019 | Su | ......................... | H04L 9/3226 |

(Continued)

FOREIGN PATENT DOCUMENTS

| | | |
|---|---|---|
| CN | 111615748 A | 9/2020 |
| WO | 2020170233 A1 | 8/2020 |

OTHER PUBLICATIONS

Onuma et al., "ECU Software Updating in Future Vehicle Networks", IEEE, pp. 36-40 (Year: 2017).*

(Continued)

*Primary Examiner* — Anil Khatri

(74) *Attorney, Agent, or Firm* — Christopher J. Storms; Brooks Kushman P.C

(57) ABSTRACT

A vehicle ECU receives an ECU update package from a remote source. The ECU verifies a first timestamp included with the ECU update package postdates a second timestamp stored onboard the vehicle in conjunction with a last-successful update of the ECU and obtains a unique vehicle identifier from the vehicle bus. The ECU obtains secure configuration data for the ECU included in a payload of the update package and calculates a first hash value using at least the unique vehicle identifier and the secure configuration data. Also, the ECU validates the update package based on comparison of the first hash value matching a second hash value included in the update package and, responsive to the first timestamp post-dating the second timestamp and validation of the update package, modifies the ECU through use of the secure configuration data.

18 Claims, 3 Drawing Sheets

(56) References Cited

U.S. PATENT DOCUMENTS

| | | | |
|---|---|---|---|
| 10,599,418 B2* | 3/2020 | Kiyama | H04L 67/12 |
| 10,621,796 B2* | 4/2020 | Gintz | G06F 8/65 |
| 10,706,140 B2* | 7/2020 | Hassani | G06F 21/445 |
| 10,732,959 B2* | 8/2020 | Jayaraman | H04L 41/0853 |
| 10,929,123 B2* | 2/2021 | Fox | G06F 11/1629 |
| 11,301,238 B2* | 4/2022 | Yeh | G06F 8/65 |
| 11,321,072 B2* | 5/2022 | Hassani | G06F 21/44 |
| 11,379,213 B1* | 7/2022 | Ansay | G06F 21/57 |
| 11,422,792 B2* | 8/2022 | Brugman | H04L 9/3247 |
| 11,429,377 B2* | 8/2022 | Mezaael | G06F 8/658 |
| 11,681,811 B1* | 6/2023 | Dixit | H04L 9/50 726/25 |
| 11,704,107 B2* | 7/2023 | McFarland, Jr. | H04L 12/12 717/168 |
| 11,740,885 B1* | 8/2023 | Fields | B60W 50/082 717/172 |
| 11,788,849 B2* | 10/2023 | Lei | G01C 21/3685 701/423 |
| 2019/0266146 A1 | 8/2019 | Rose et al. | |

OTHER PUBLICATIONS

Sarwar et al., "Network of ECUs Software Update in Future vehicles", IEEE, pp. 1-5 (Year: 2019).*

Mbakoyiannis et al., "Secure Over-the-air Firmware Updating for Automotive Electronic Control Units", ACM, pp. 174-181 (Year: 2019).*

Reschka et al., "Specifying a middleware for distributed embedded vehicle control systems", IEEE, pp. 117-122 (Year: 2014).*

Palappert et al., "Secure and Lightweight ECU Attestations for Resilient Over-the-Air Updates in Connected Vehicles", ACM, pp. 283-297 (Year: 2023).*

Qian, "Toward a Unified Operational Semantics-based Approach to Modeling and Verifying Dynamic Software Updating", IEEE, pp. 649-652 (Year: 2018).*

* cited by examiner

SECURE UPDATE AND AUDIT OF ELECTRONIC CONTROL UNITS

TECHNICAL FIELD

The illustrative embodiments, and the like, generally related to secure update and audit of electronic control units.

BACKGROUND

With an increasing number of electronic control units (ECUs) and other software/firmware updateable vehicle parts, as well as the prevalence of over the air and remote updates, creating systems that can be remotely accessed without requiring a hard-wired connection, increasing care needs to be taken to ensure that only proper entities are allowed to and are capable of updating vehicle software and firmware.

Vehicles have become ever increasingly complex computing entities, and this trend shows no sign of slowing. This has lead to the use of numerous ECUs and onboard software to operate and interact with various vehicle systems. Further, original equipment manufacturers (OEMs) have a vested interest in being able to continually update such systems in order to provide continual better customer experience. In the interest of providing fast solutions and preventing overwhelming dealerships, the trend has been to provided downloadable updates that can be used to update vehicle systems and software at appropriate times. Moreover, as the industry begins to contemplate subscription-based software models, allowing for on-demand addition of functionality, such updates will likely become even more common.

OEMs and other legitimate providers of vehicle software and firmware solutions are continually seeking to protect and better protection of remote vehicle access, to diminish malicious assault and ensure that parts are correctly and legitimately installed and updated.

SUMMARY

In a first illustrative embodiment, a vehicle includes a vehicle bus and at least one vehicle electronic control unit (ECU) configured to receive an ECU update package from a remote source. The ECU is further configured to verify a first timestamp included with the ECU update package postdates a second timestamp stored onboard the vehicle in conjunction with a last-successful update of the ECU and obtain a unique vehicle identifier from the vehicle bus. The ECU is additionally configured to obtain secure configuration data for the ECU included in a payload of the update package and calculate a first hash value using at least the unique vehicle identifier and the secure configuration data. Also, the ECU is configured to validate the update package based on comparison of the first hash value matching a second hash value included in the update package and, responsive to the first timestamp post-dating the second timestamp and validation of the update package, modify the ECU through use of the secure configuration data.

In a second illustrative embodiment, a method includes receiving an electronic (ECU) update package from a remote source at an ECU of a vehicle. The method also includes obtaining, at the ECU, a unique vehicle identifier from a vehicle bus of the vehicle. The method further includes obtaining, at the ECU, secure configuration data for the ECU included in a payload of the update package. Also, the method includes calculating, via the ECU, a first hash value using at least the unique vehicle identifier and the secure configuration data. The method additionally includes validating the update package based on comparison of the first hash value matching a second hash value included in the update package and, responsive to the validating of the update package resulting in a match, modifying the ECU using the secure configuration data.

In a third illustrative embodiment, a vehicle includes a vehicle bus and at least one vehicle electronic control unit (ECU) configured to receive an audit instruction and responsively obtain a unique vehicle identifier from the vehicle bus. The ECU is further configured to obtain secure configuration data for the ECU stored in conjunction with the ECU and calculate a first hash value using at least the unique vehicle identifier and the secure configuration data. The ECU is additionally configured to obtain a second hash value stored in conjunction with the ECU following a prior modification of the ECU to include the secure configuration data. Also, the ECU is configured to validate the secure configuration data based on the first hash value matching the second hash value and, responsive to a validation error, notify a manufacturer of the vehicle of the error.

DETAILED DESCRIPTION

Figure 1:
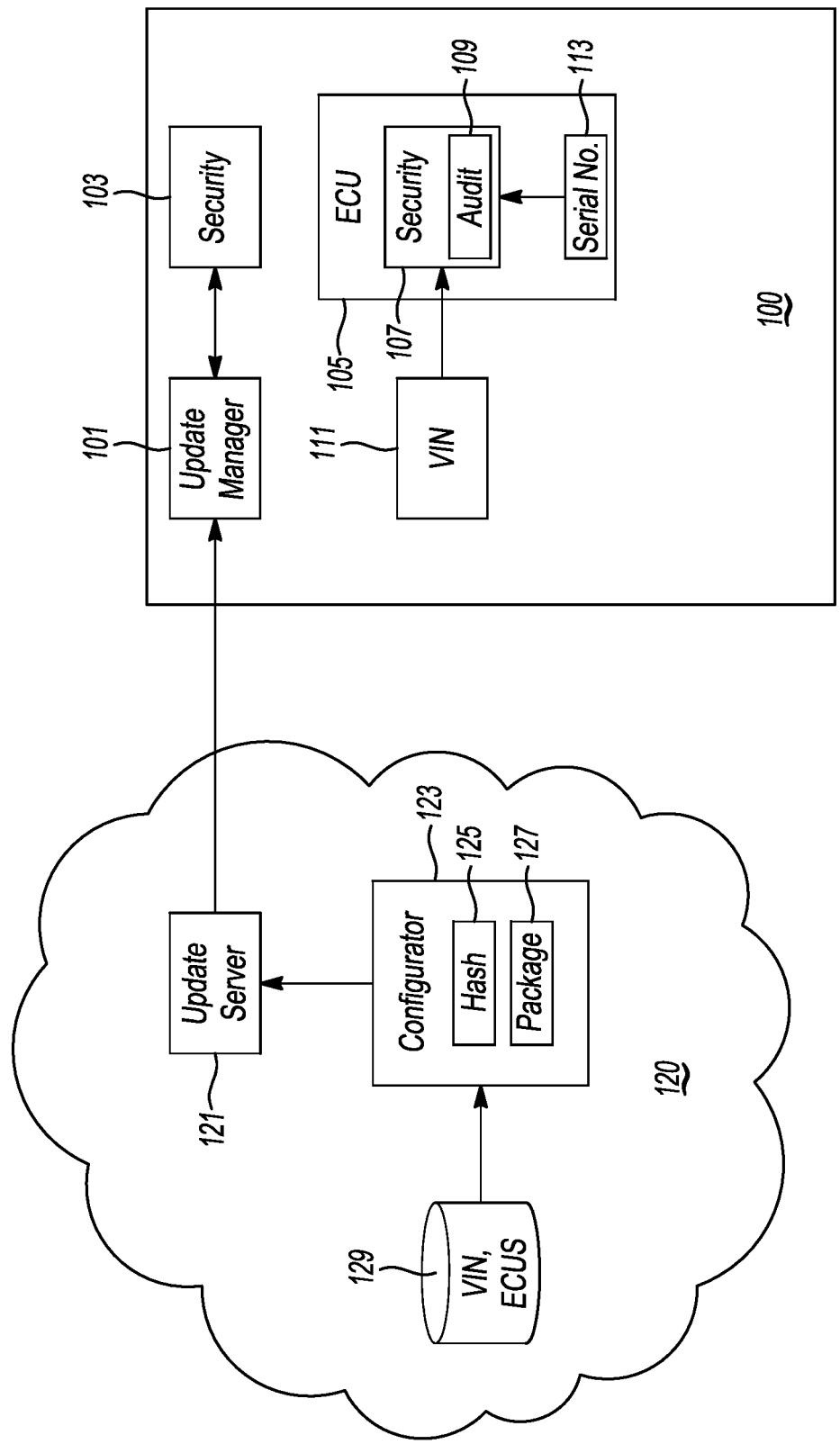
FIG. 1 shows an illustrative example of an ECU update and audit system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

It is becoming common for automotive OEMs to release various configuration and update packages for the ECUs residing on a given vehicle. While receipt and installation of these ECUs used to take place at dealerships, now they are often delivered over the air, and vehicles can, at appropriate times, update the corresponding onboard systems. OEMs typically want newer updates installed over older ones, want error detection and reversion handling to diminish reliance on an incomplete update, and want to ensure that only approved changes are made to a vehicle configuration.

The illustrative embodiments proposed ECU-specific updates targeted at a specific ECU on a specific vehicle having a specific vehicle identification number (VIN) or other unique identifier. Not only does this allow for the update to be targeted, but it allows for the vehicle to confirm that it was the intended target and the ECU to confirm that it was the intended ECU. Values can be hashed as needed for security, and validated by re-hashing comparable data on the vehicle-side to ensure a match. This process can occur both for package validation and audit purposes, as things like a VIN do not change over time.

FIG. 1 shows an illustrative example of an ECU update and audit system. In this example, an update server 121 residing remotely from the vehicle 100 (e.g., in the cloud 120), receives various vehicle updates to be delivered for certain ECUs on certain vehicles. As an update is to be distributed, the server selects a vehicle for receipt of the update based on either a request from the vehicle or a correlation of the vehicle (e.g., make, model, etc.) to parameters specified in association with the update.

A configurator process 123 accesses a list of VINs 129 associated with vehicles, including target vehicle 100. This data may include, for example, ESNs of all ECUs installed on the given vehicle 100, as well as currently installed software/firmware versions, etc. The configurator can calculate a hash using a hashing function known to the server 121 and vehicle 100. The hash 125 may use the VIN or other unique vehicle identifier, so that when the vehicle 100 receives the package, it can calculate a hash using the same function and its own VIN, to ensure the package was intended for that vehicle by comparison of the received hashed value with the onboard calculated value. The hash may also include secure configuration data, which can be retrieved from the package and used in the onboard hash for comparison purposes. That way, if the secure configuration data was altered in transit, the hash will not match.

The configurator may also build the payload for the package, which can include, for example, data for installation at the ECU, the hashed value, an identifier, and any other necessary data. The payload may also have a header packet or other data indicating which ECU is to receive the data and a timestamp.

When a vehicle update manager 101 receives the package, it can run any initial verification checks using a security routine 103—e.g., validating values in the header, the signature, etc. The update manager can then pass the package to the designated ECU 105, which can verify that the timestamp associated with the update does not predate an already-installed update. That is, when an update is installed in the ECU, the timestamp from that update can be preserved locally, and any new updates should have later-in-time timestamps. The ECU can also verify that the ESN corresponds to that ECU's ESN 113, and compute the hash from the VIN 111 (available to the ECU on a vehicle bus) using a security process 107 to determine that the package was validly deployed to the correct vehicle 100.

For any given update, the ECU 105 may store the timestamp and data hash value. The secure configuration data, used in the hash, is installed in the ECU and so also persists. When the ECU performs an audit 119, it can use the persistent vehicle VIN and installed secure configuration data to rebuild the expected hash value, which is also stored as noted above. If the two do not match, then the ECU has been installed in a different vehicle (resulting in a new VIN pulled from the bus and used in the audit, that does not match the original VIN for which the update was intended) or that the configuration data used to compute the hash has been somehow corrupted or altered. Appropriate action can then be taken.

Figure 2B:
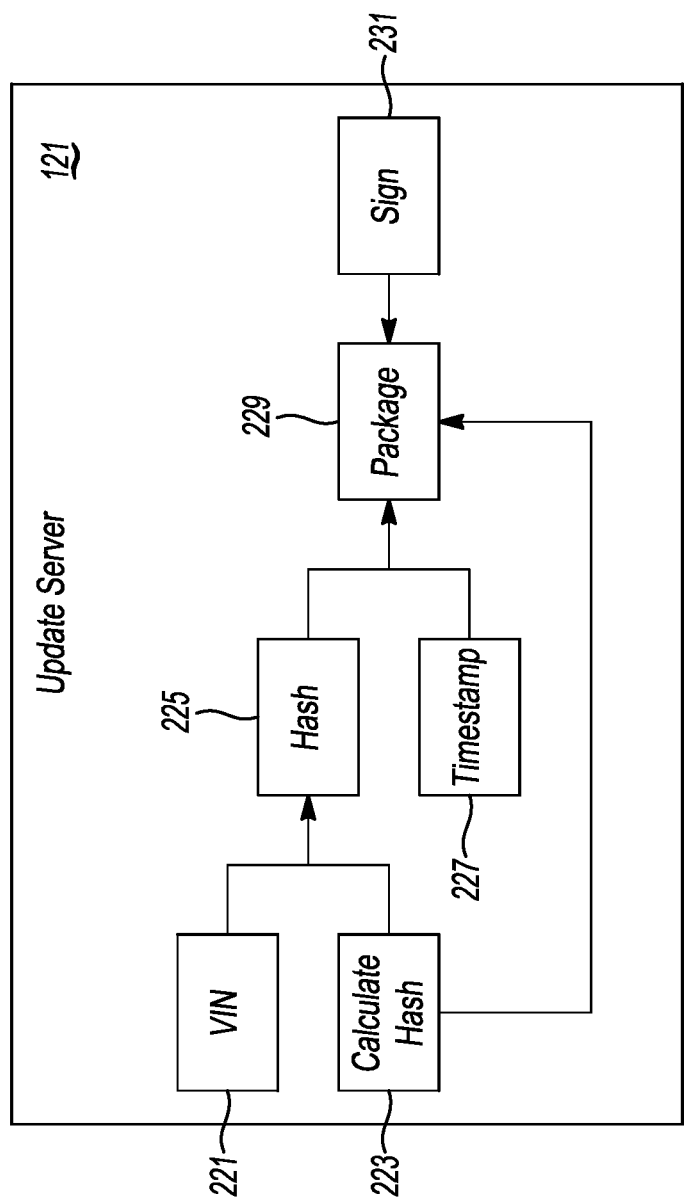
FIG. 2b shows an illustrative update server.
Figure 2A:
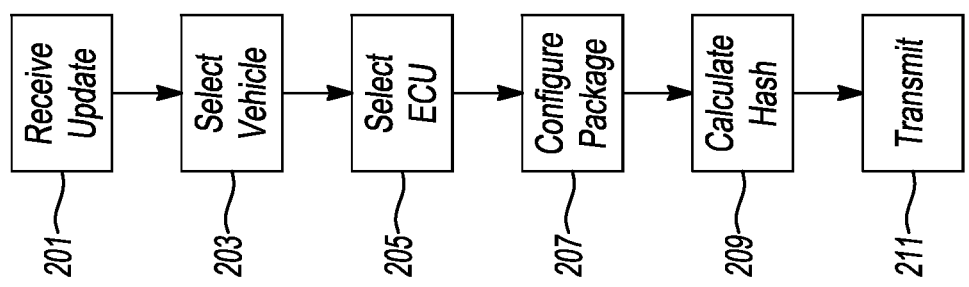
FIG. 2a shows an illustrative process for update packaging.

FIG. 2a shows an illustrative process for update packaging. In this example, the update server 121 receives a vehicle update 201 or a request from a vehicle for an already-received update if the vehicle is pulling an update (e.g., to replace an incomplete update attempt). Based on data indicated in associated with the received update, or the request, the server 121 can select a specific vehicle VIN and target ECU at 203 and 205, both of which may be stored in a server-accessible database and/or may be included in a request. Even if the VIN and ECU are included in the request, the server may use any local data to validate that the ECU ESN included in a request corresponds to the VIN included in a request to prevent creating a package for an ECU that has been improperly moved to a new vehicle and simply relying on the combination of VIN and ESN identified in a request from that vehicle to build the security check.

The server 121 then configures the update package at 207, which can include a payload, signature, header file, ECU ESN, hash of the VIN and secure configuration data determined at 209, timestamp, etc. The server 121 can then transmit the data at 211.

FIG. 2b shows an illustrative update server. This server has access to, for example, VIN data or other unique vehicle identifiers 221 and the secure configuration data 223 associated with a given deliverable. Those two values can be used in the hash 225, which creates a value usable for immediate and future (via audit) verification. A timestamp 227 can be appended which creates assurances that an older update (replayed or late-delivered) will not be used to replace a newer-installed update. This information can then be combined into the package, which may include the actual secure configuration value and a secure signature 231.

Figure 3:
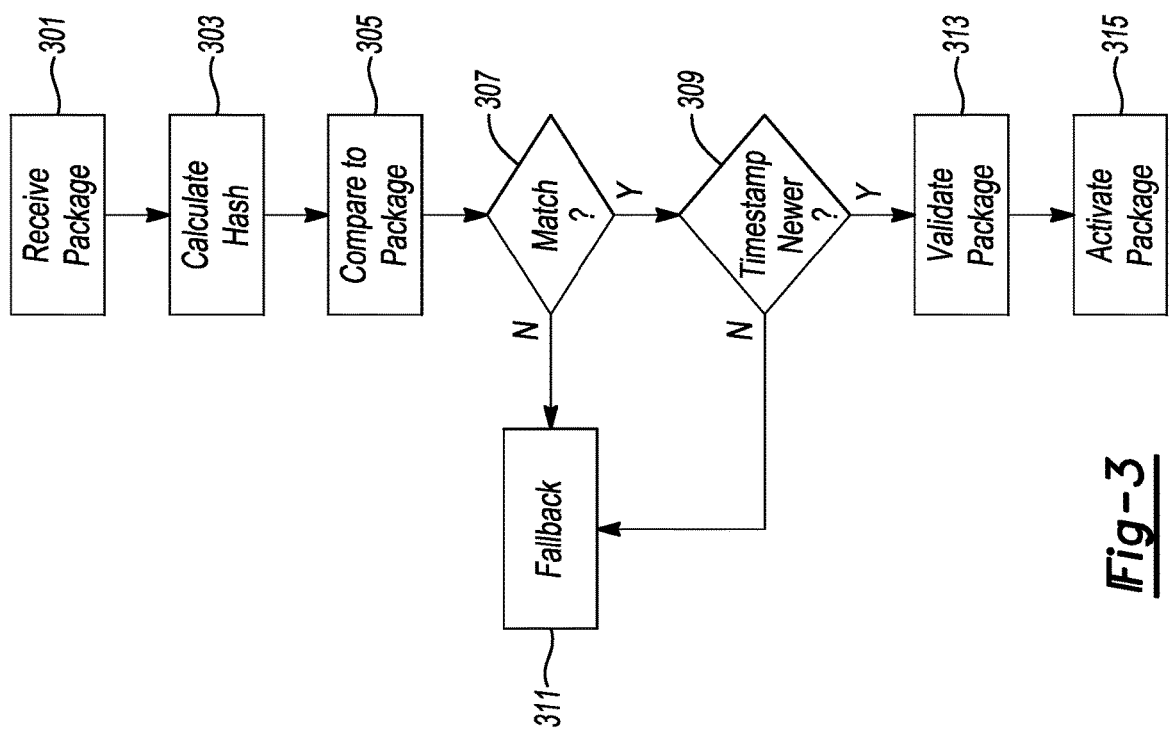
FIG. 3 shows an illustrative update handling process with verification.

FIG. 3 shows an illustrative update handling process with verification. On the vehicle side, the vehicle update manager may receive the signed package at 301. In one example, the vehicle update manager will be responsible for delivering the received packages to the ECUs, but the ECU will perform some of the validity checks. The ECU can use a package-specified algorithm to calculate a signature and compare the signature to the signature of the received package.

Using the secure configuration package data received and a locally received VIN from a vehicle bus, the ECU can calculate the expected hash value at 303. If someone were able to fool the ECU with a targeted VIN broadcast for purposes of installation, which may create other discernable issues and be preventable, the installed configuration data would still not pass an audit as shown below, because the VIN would still be drawn from the bus and thus the targeted VIN broadcast (spoofing the VIN for the particular ECU) would have to exist perpetually during every audit. If the VIN broadcast across the whole bus were changed, this would invalidate other features on the vehicle because those ECUs would then receive the wrong VIN for their audit purposes. Accordingly, using the persistent local value and the transmitted configuration value, assurances of present and future validity can be preserved.

If the computed hash of the VIN and secure configuration data matches at 307, the ECU may also ensure the timestamp indicates a new update at 309. That is, an attack could send an old configuration file, which may be otherwise valid, to attempt to rollback system software (e.g., if an old state was known to be vulnerable, then the software could be rolled back to the vulnerable state via replay of a valid, but older, package delivery). Accordingly, the package may not be validated for installation until the ECU confirms that the timestamp included therein is not dated prior to a timestamp saved with respect to a current configuration. If either verification step results in error, the ECU can fallback to old data at 311 which may be included in the update package and/or refuse installation of the new data to overwrite existing ECU data.

If the hashes match and the timestamp is appropriate, the ECU can validate the package at 313 and proceed to take an action specified in the package at 315, which can include, for example, addition of secure configuration data, update of secure configuration data, deletion of secure configuration data, etc.

Figure 4:
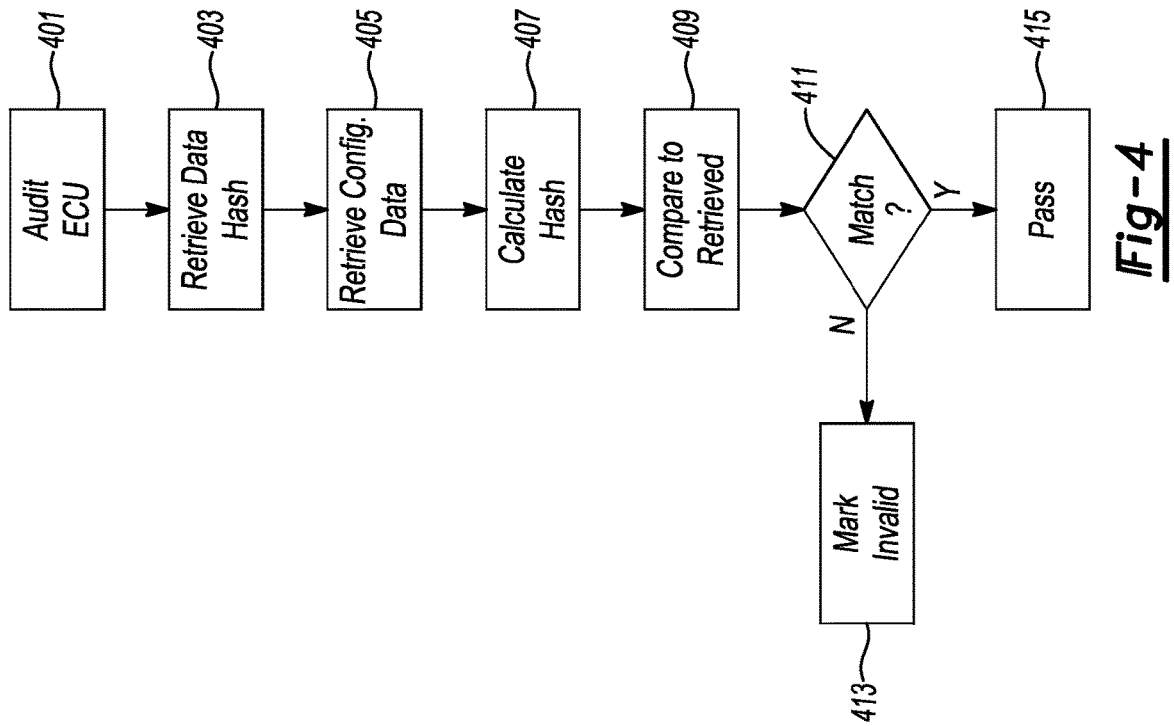
FIG. 4 shows an illustrative ECU audit process.

FIG. 4 shows an illustrative ECU audit process. This process can be undertaken by the ECU to periodically verify the validity of both installed software and that the ECU is in a correct vehicle. As noted above, the ECU, during validated processing of a secure configuration package, may install secure configuration data, save the associated timestamp, and save the expected data hash of the VIN and secure configuration data.

The ECU may go into audit mode at 401 in at least the following examples—1) to validate the integrity of newly installed and activated secure configuration packages; 2) to monitor and detect a corruption of installed and active secure configuration data; 3) monitor and detect secure configuration data intended for a different VIN. Audits and an incentive to swap ECUs may become more important when software-as-a-service is present, and users may pay thousands of dollars for certain features to be enabled. That may create an incentive to move or swap certain enabled ECUs which may have additional value because of their properly installed configurations. While the issue can be handled by properly transferring an ECU with OEM permission (e.g., via correct update of the software for the new VIN, replacing the hash value even if the secure configuration data is essentially the same), moving an ECU to a new vehicle will create an instance of the ECU having a hash value that correlates to the old vehicle. Thus, when the ECU performs an audit and receives the new VIN from the bus (since that is what the new, improper vehicle will broadcast), the hash will no longer match the stored hash. Only by broadcasting the old VIN on the vehicle networks will the hash compute, but then the other ECUs on that network will not pass their audits, because they will no longer be computing the correct hash for their currently installed versions. Message authentication can also be used in conjunction with VIN broadcast to prevent many of these scenarios.

Once a configuration package has been installed, for example, an audit can be scheduled or take place some time period after installation. This can be near-immediate, or at some point soon thereafter. If there is belief that an improper VIN may be being used via direct transmission to an ECU during installation, then an audit should resolve the issue unless the VIN is continually supplied to the ECU. This audit will reveal the improper installation because, in the absence of the false VIN supplied to the ECU, the hash will not match.

Periodic audits can also occur at predefined or random intervals to detect corruption of configuration data. Since the hash comprises both the VIN and the configuration data, in this example, bad data on either side will cause the hash to produce a different result. So, even though the VIN may be correct in this example (assuming the data was initially correctly installed and had later been, for example, corrupted or tampered with), the data will be incorrect and the hash matching will not succeed.

Periodic audits can also occur to detect ECU swaps, because while the ECU may have been validly updated and configured for a first VIN, installation of the ECU in a new vehicle will result in a different VIN on the bus for the ECU retrieval, and the hash will not match the expected value because the wrong VIN will be present and used for the hash.

Audits may also be randomly or purposefully requested by the OEM, if, for example, there is a belief that audits are appropriate. For example, scheduled or random audits may reveal certain patterns that indicate other audits of certain vehicles or ECUs should occur, and the OEM can use this information to request audits to determine if a broader pattern of disfavored behavior is occurring.

While the audit is occurring, the ECU can retrieve the stored data hash at 403 that was received from the update server with the update and that was stored when the ECU was correctly updated. The ECU can also retrieve the (presumably) valid configuration data installed in the ECU and VIN from the vehicle bus at 405, and calculate the hash at 407. As long as the VIN matches the designated VIN for the update and the installed configuration data is valid (matches the originally supplied data), the hash value should match the retrieved hash value in comparison at 409. If there is a match at 411, the ECU can consider the audit passed at 413, send any necessary information related to the audit and schedule another audit if scheduling is used to plan audits. If there is not a match, the ECU can mark the data invalid and use alternative fallback data or disable certain functionality at 415, and may notify the driver, server, OEM, etc. of the error. For example, the ECU could send a message to the server with the notification of error and the VIN obtained from the bus, and this would quickly reveal if the VIN or the data was the source of the issue. The server could then take appropriate action, such as scheduling an update for corrupted data or notifying the proper parties if the ECU had been moved to another vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a vehicle bus; and
at least one vehicle electronic control unit (ECU) configured to:
receive an ECU update package from a remote source;
verify a first timestamp included with the ECU update package postdates a second timestamp stored onboard the vehicle in conjunction with a last-successful update of the ECU;
obtain a unique vehicle identifier from the vehicle bus;
obtain secure configuration data for the ECU included in a payload of the update package;
derive a first hash value using at least the unique vehicle identifier and the secure configuration data;
validate the update package based on comparison of the first hash value matching a second hash value included in the update package; and
responsive to the first timestamp post-dating the second timestamp and validation of the update package, modify the ECU through use of the secure configuration data;
wherein the ECU is further configured to store the second hash value responsive to successful modification of the ECU using the secure configuration data.

2. The vehicle of claim 1, wherein the validation further includes the ECU being configured to validate a signature of the update package using a cryptographic algorithm referenced as part of the update package.

3. The vehicle of claim 1, wherein the unique vehicle identifier is a vehicle identification number.

4. The vehicle of claim 1, wherein the validation further includes the ECU being configured to compare a first electronic serial number of the ECU to a second electronic serial number included in the update package to confirm that the ECU is an intended ECU for installation, indicated by the second electronic serial number.

5. The vehicle of claim 1, wherein the ECU is further configured to store the first timestamp responsive to successful modification of the ECU using the secure configuration data.

6. A method comprising:
receiving an electronic (ECU) update package from a remote source at an ECU of a vehicle;
obtaining, at the ECU, a unique vehicle identifier from a vehicle bus of the vehicle;
obtaining, at the ECU, secure configuration data for the ECU included in a payload of the update package;
deriving, via the ECU, a first hash value using at least the unique vehicle identifier and the secure configuration data;
validating the update package based on comparison of the first hash value matching a second hash value included in the update package; and
responsive to the validating of the update package resulting in a match, modifying the ECU using the secure configuration data;
wherein the ECU is further configured to store the second hash value responsive to successful modification of the ECU using the secure configuration data.

7. The method of claim 6, wherein the validating further includes validating a signature of the update package using a cryptographic algorithm referenced as part of the update package.

8. The method of claim 6, wherein the unique vehicle identifier is a vehicle identification number.

9. The method of claim 6, wherein the validating further includes comparing a first electronic serial number of the ECU to a second electronic serial number included in the update package to confirm that the ECU is an intended ECU for installation, indicated by the second electronic serial number.

10. The method of claim 6, further comprising:
verifying, using the ECU, a first timestamp included with the ECU update package postdates a second timestamp stored onboard the vehicle in conjunction with a last-successful update of the ECU; and
wherein the modifying is further responsive to the verifying that the first timestamp postdates the second timestamp.

11. The method of claim 10, wherein the ECU is further configured to store the first timestamp responsive to successful modification of the ECU using the secure configuration data.

12. A vehicle comprising:
a vehicle bus; and
at least one vehicle electronic control unit (ECU) configured to:
receive an audit instruction and responsively:
obtain a unique vehicle identifier from the vehicle bus;
obtain secure configuration data for the ECU stored in conjunction with the ECU;
derive a first hash value using at least the unique vehicle identifier and the secure configuration data;
obtain a second hash value stored in conjunction with the ECU following a prior modification of the ECU to include the secure configuration data;
validate the secure configuration data based on the first hash value matching the second hash value; and
responsive to a validation error, notify a manufacturer of the vehicle of the error;
wherein the ECU is further configured to store the second hash value responsive to successful modification of the ECU using the secure configuration data.

13. The vehicle of claim 12, wherein the unique vehicle identifier is a vehicle identification number.

14. The vehicle of claim 12, wherein the audit instruction is received based on a scheduled audit of the ECU.

15. The vehicle of claim 12, wherein the audit instruction is received based on a remote instruction from the manufacturer.

16. The vehicle of claim 12, wherein the audit instruction is received based on a random audit of the ECU.

17. The vehicle of claim 12, wherein the notification includes the unique vehicle identifier.

18. The vehicle of claim 12, wherein the ECU is further configured to disable at least partial functionality of the ECU responsive to the validation error.

* * * * *